United States Patent [19]

Köbler

[11] Patent Number: 4,512,845
[45] Date of Patent: Apr. 23, 1985

[54] APPARATUS FOR JOINING A PLURALITY OF SUPER-IMPOSED WEBS RECEIVED FROM A ROTARY PRINTING MACHINE

[75] Inventor: Ingo Köbler, Anhausen, Fed. Rep. of Germany

[73] Assignee: M.A.N.-Roland Druckmaschinen Aktiengesellschaft, Offenbach am Main, Fed. Rep. of Germany

[21] Appl. No.: 510,201

[22] Filed: Jul. 1, 1983

[30] Foreign Application Priority Data

Jul. 17, 1982 [DE] Fed. Rep. of Germany ....... 3226907

[51] Int. Cl.³ .............................................. B42D 1/00
[52] U.S. Cl. .................................... 156/548; 156/152; 156/204; 156/291; 156/443; 270/37; 270/53
[58] Field of Search ............... 156/291, 548, 152, 324, 156/204, 443, 547, 549–551, 555; 281/21, 18; 270/53, 37–38, 32

[56] References Cited

U.S. PATENT DOCUMENTS

| 2,168,547 | 8/1939 | Wood | 270/37 X |
| 2,511,303 | 6/1950 | Stevens et al. | 156/548 X |
| 3,674,608 | 7/1972 | Nystrand | 156/548 X |
| 3,920,267 | 11/1975 | Lyon | 281/18 X |

FOREIGN PATENT DOCUMENTS 2932757 3/1982 Fed. Rep. of Germany .

Primary Examiner—David Simmons
Attorney, Agent, or Firm—Frishauf, Holtz, Goodman & Woodward

[57] ABSTRACT

To eliminate the necessity for stapling together web portions which are derived, for example, from a rotary printing machine, and superimposed, and which should be joined together, one of the web portions is deflected in a separate path and has a strip of adhesive applied transversely to the direction of movement, for example by passing the web portion between a pair of rollers, one of which has adhesive applied thereto. The web is passed free from contact with the two rollers of the pair, and the uncoated roller, at least, is formed with a projecting strip providing an impression or counter strip to press the web portion against the adhesive coating on the other roller to thereby apply an adhesive strip thereon. The two web portions are then guided into contact with each other and folded in the folding apparatus transversely to the movement at a fold line (19). The projecting strip need not be continuous, but may be a row of projecting bumps or teeth (FIGS. 3, 4) which cooperate with similar bumps and teeth on the other roller, or with a strip.

20 Claims, 4 Drawing Figures

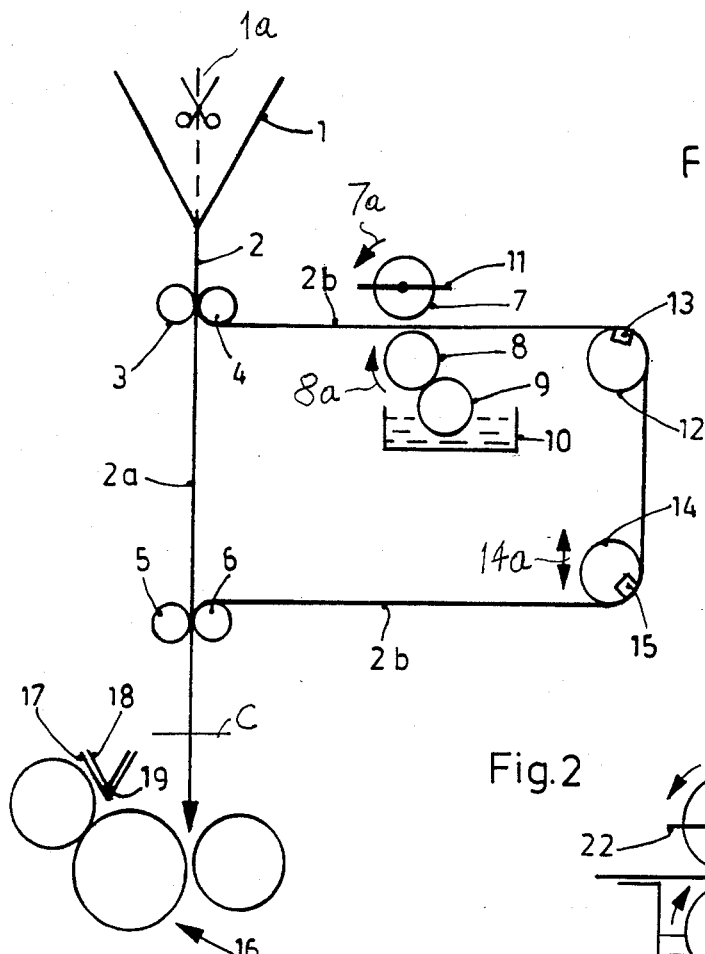
Fig.1
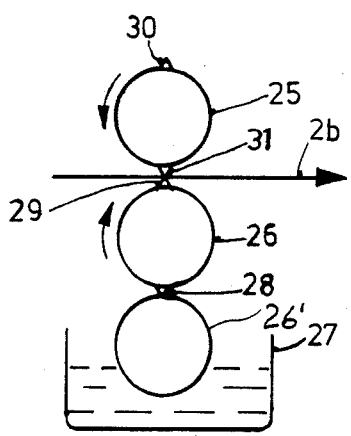
Fig.3
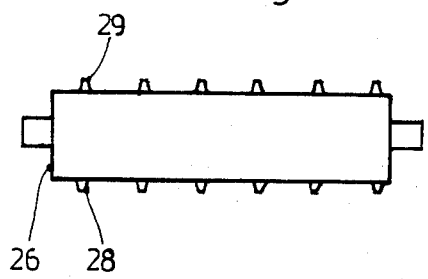
Fig.2
Fig.4

APPARATUS FOR JOINING A PLURALITY OF SUPER-IMPOSED WEBS RECEIVED FROM A ROTARY PRINTING MACHINE

The present invention relates to apparatus to join superimposed webs delivered continuously moving from, for example, a folding apparatus of a rotary printing machine. The folding apparatus folds the webs longitudinally, for example by guiding them over a folding former, and the thus derived superimposed webs are severed and conducted to a folding apparatus, known per se, which folds the superimposed webs along the folding line transverse to the direction of movement. The present invention is directed to apparatus to join the superimposed webs together so that, when they are commonly folded along the fold line by the transverse folding apparatus, they will not separate.

BACKGROUND

Adhering superimposed webs which are folded at a fold line so that they will not be separated has been described in the referenced German Patent DE-PS No. 29 32 757. This patent describes delivery of webs to a folding former from a printing machine, and then to adhere the separate sheets together by staples or the like. The stapling apparatus is complex and requires accurately synchronized operation with the printing machine. The costs of such stapling apparatus are high.

THE INVENTION

It is an object to provide apparatus to join superimposed webs, delivered from a rotary printing machine, for example, by apparatus which is simple, inexpensive, and essentially trouble-free.

Briefly, one of the webs is deflected in a separate path. While traveling in this path, the web receives a strip of adhesive transverse to its direction of movement at the side which, upon returning of the web to the path of the web portion with which it is to be superimposed, the adhesive will come to lie thereagainst. The webs are then folded by a folding apparatus, for example by a pair of rollers between which they are introduced by a knife blade, and pinched. The webs can be cut before being folded transversely, or during the folding operation, by any suitable cutter arrangement, well known and standard in the art.

DRAWINGS

FIG. 1 is a schematic side view of the arrangement for joining two webs which are received from a folding triangle or folding former and introduced into a transverse folding apparatus;

FIG. 2 is a schematic side view of another embodiment of an adhesive application apparatus;

FIG. 3 is a side view of yet another embodiment of an adhesive application apparatus; and FIG. 4 is a schematic axial view of an adhesive application drum used in the embodiment of FIG. 3.

A rotary printing machine—not shown—delivers a web of paper 2 which is folded by being guided over a folding former or folding funnel 1, and, at the same time, is slit longitudinally as schematically illustrated by the scissor symbol 1a. The web 2, thus, is cut into two web portions 2a, 2b which are, initially, superimposed. The web portions 2a, 2b are pulled off the former and cutter apparatus 1, 1a by a pair of pull-off rollers 3, 4. The pull-off roller 4 has an additional function, namely forming a deflection roller for the web portion 2b, and deflects the web portion 2b into a separate path. The separate path extends, for example, by about 90° from the straight path of the web 2a. The web 2a is guided directly to a further pair of rollers 5, 6. The web 2b, however, in the separate path passes through an adhesive application apparatus before being returned to superimposed position of the web portion 2a between the rollers 5, 6, roller 6 again having the dual function of a pull-off roller and a deflection or guide roller.

The web portion 2b is guided between a pair of rollers 7, 8 to clear both the rollers, that is, without touching them. The lower roller 8 of the pair 7, 8 receives adhesive from an adhesive roller 9 which rotates within an adhesive trough 10. Adhesive trough 10 retains a paper adhesive, preferably in liquid form, of any suitable and well-known composition. The quantity of the adhesive to be applied can be controlled, if necessary, by using a doctor blade and engaging the doctor blade with one of the rollers 9, 8, if needed. Such a doctor blade has been omitted from the drawing for clarity since its use is well known. The rollers 7, 8, 9 are driven, as schematically indicated by the rotation arrows 7a, 8a such that their linear surface speed corresponds to the speed of the paper web 2 and, hence, to the speed of the web portions 2a, 2b.

Upon rotation of rollers 8, 9, the entire circumference of roller 8 is coated with adhesive. The roller 7, above the paper web, is constructed in form of an intermittent engagement or touch roller by having a projecting ridge or bead 11 extending from the circumference thereof. More than one such bead may be provided and, as shown in FIG. 1, two such beads or strips are located diametrically opposite each other. The number of beads or strips, for example two diametrically oppositely positioned strips as shown in FIG. 1, will depend on the diameter of the rollers 7, 8 and the dimension of the material to be folded transversely—as will appear—and adhered to the web portion 2a.

The freshly printed web portion 2b, preferably guided between the rollers 7 and 8 to clear the rollers and not to touch them, will receive an adhesive strip transversely to the direction of movement of the web portion 2b when the rollers 7, 8 at a specific predetermined position are in the location in which the ridge or strip or bead 11 is above a circumferential portion of the roller 8. When in this position, the web portion 2b is pressed against the adhesive application roller 8, resulting in a thin strip of adhesive on the bottom side—with respect to FIG. 1—of the web portion 2b extending transversely to the major direction or extent of the web, and to the direction of movement thereof.

The web portion 2b is returned for contact with the web portion 2a by two deflection rollers 12, 14. The deflection rollers 12, 14 are formed with circumferential grooves 13. The distance between the deflection roller 12 and the rollers 7, 8, as well as the diameter thereof, is so matched to the spacing between the adhesive strips applied by the ridges 11 that the adhesive strip on the inner side of the web portion 2b will fit over the groove 13, thus preventing smearing of the adhesive strip on the circumference of the roller 12. Roller 12, thus, will always be clean. Roller 14 is constructed similarly with a groove 15, and deflects the web portion 2b back to the roller 6. One of the deflection rollers 12, 14—as shown in FIG. 1, the roller 14—is formed as a register control roller. Its center of rotation is adjustable, for example by locating axial stubs in an eccenter, in a slide way or the like, as schematically indicated by double arrow 14a. Thus, the path length through which the partial web 2b travels between deflection by rollers 4 and 6 can be changed. By suitable adjustment, that is, shifting of the position of the center of rotation of the register and deflection roller 14, it is possible to so guide the partial web 2b back to the partial web 2a that the two webs are adhered at a desired transverse strip, for example at the common folding line. Adhesion, by engagement pressure, is effected by the rollers 5, 6.

After adhesion of the web portions 2a, 2b between rollers 5, 6, a transverse cut is made, by apparatus (not shown) and which may be of any well known standard and suitable construction. The two joined webs are then folded in a transverse folding apparatus 16. The folded product is schematically shown above the folding apparatus 16, in which two superimposed sheets 17, 18, generated by cutting the web portions 2a, 2b, for example at the cutter location C, are adhered together along the folding line 19. No further stapling or other separate attachment process need be used.

FIG. 2 illustrates another system to apply adhesive, which can be advantageously used in the apparatus of FIG. 1. The web portion 2b is guided close to the upper edge or rim of an adhesive container 24. An adhesive application roller 21, driven as shown by the rotation arrow, is located within liquid adhesive in the trough 24. The application roller 20 may have one or more engagement strips, ridges or beads, FIG. 2 illustrating two ridges 22, 23. Upon rotation of rollers 20, 21, the web portion 2b is pressed for a short instant against the adhesive application roller 21. By guiding the web portion 2b closely above the adhesive trough 24, it is possible to practically completely close off the trough 24 and prevent escape of noxious smells and volatile components which may be contained within the adhesive material in the trough 24.

Another desirable construction of applying adhesives is shown in FIGS. 3 and 4. The web portion 2b is guided between the adhesive application roller 26 and an engagement roller 25, without touching either of the rollers. The application roller 26 is coupled to an adhesive supply roller 26' which rotates within an adhesive trough 27, to apply to adhesive to rollers 26.

The application roller 25, rather than having continuous ridges or strips thereon, is formed with circumferentially positioned bumps or teeth 29—see FIG. 4— which are located axially spaced from each other on the circumference of the roller 26. Two such rows 28, 29 are provided. The bumps or teeth may be trapeze-shaped, or have rectangular cross section, and the rows 28, 29 are diagonally located opposite each other. These bumps or teeth in the rows 28, 29 are located on the adhesive application roller 26 so that the teeth or bumps only will be coated with adhesive by engagement with the roller 26'. Upon rotation of the roller 26, adhesive is supplied to the lower side of the web portion 2b. The roller 25 has similar bumps or teeth 30, 31 located on its circumference and so positioned that, when the bumps or teeth 28, 29 and roller 26 apply adhesive, the bumps or teeth 30, 31 on roller 25 insure engagement of the web with the adhesively coated bumps or tips of the rows 28, 29. Thus, depending on the arrangement and cross-sectional shape of the bumps or teeth 28, 29, and on the counter or impression bumps or teeth 30, 31, adhesive in the form of adhesive dots or short strips is applied to the web portion 2b.

The arrangement of FIGS. 3 and 4 may, of course, also be used with continuous strips such as shown at 11, 22, 23 in FIGS. 1 and 2. Thus, either one of the rollers 25, 26, or both, may be formed with respectively matching and, preferably, diametrically positioned continuous strips. For example, roller 25 may be formed with a continuous strip which is used only as a count or impression element for the bumps or teeth 28, 29 of the adhesive application roller 26.

In accordance with a preferred form, the bumps or teeth of the rows 28, 29, as well as the bumps or teeth 30, 31, or equivalent ridges, are made of an elastic material, for example hard rubber. If teeth or bumps 28, 29; 30, 31 are used, the length of the adhesive application surfaces of the individual bumps or strips of the rows 28, 29 should be longer in axial direction than in circumferential direction, as can be clearly seen by comparing FIGS. 3 and 4. Thus, rather than circular dots, short line elements are applied to the web portion 2b at the respective side thereof.

Various changes and modifications may be made, and features described in connection with any one of the Figures may be used with any of the others, within the scope of the inventive concept.

I claim:

1. For combination with a rotary printing machine delivering a plurality of continuously moving superimposed web portions (2a, 2b), apparatus for connecting said web portions at a folding line (19) extending transversely to the direction of movement of the web portions, comprising means (3,4) receiving said web portions in superimposed condition and guiding said web portions in a first path, deflection means (4) deflecting one (2b) of said web portions from superimposed position from the other (2a) and guiding said web portion in a separate path;

adhesive strip application roller means (7, 8; 21, 22; 25, 26) rotating at the speed of movement of the web portions for applying a strip of adhesive on said deflected web portion (2a) at the side thereof facing the other web portion;

adjustable register roller means (14) for guiding said deflected web portion in a predetermined path having a predetermined path length within said separate path;

guide roller means (6) located downstream of said register roller means (14) guiding said deflected web portion into contact with the undeflected web portion (2a), the path length of said path between said receiving means (3,4) and the guide roller means (5,6) of the deflected web portion (2b) being longer than the path length of the undeflected web portion (2a);

and a folding apparatus (16) folding said two again superimposed web portions at the folding line and insuring adhesion of the previously deflected web portion (2b) against the undeflected web portion (2a) by the adhesive on the adhesive strip at the folding line.

2. Apparatus according to claim 1, wherein the adhesive strip application roller means are driven at a circumferential speed corresponding to the linear speed of movement of the web portion (2b) being applied thereto.

3. Apparatus according to claim 1, wherein said register roller means (14) is formed with an axially directed groove (15) which is so positioned with respect to the web portion (2b) passing thereover that a strip of adhesive applied by said adhesive strip application roller means will be positioned above said groove to prevent contact of adhesive substance with the circumferential portion of the register roller (14).

4. Apparatus according to claim 1, further including a deflection roller (12) deflecting said web portion (2b) and defining at least part of said separate path, said deflection roller being formed with an axially extending groove (13) which is so positioned with respect to the web portion (2b) that a strip of adhesive applied by the adhesive application roller means will be located above said groove to prevent smearing of adhesive on the remaining circumferential portion of said deflection roller.

5. Apparatus according to claim 1, wherein said guide roller means (6) includes two rollers positioned at opposite sides of most of said web portions (2a, 2b) in contact with each other and insuring adhesion of the adhesive strip applied by the adhesive strip application roller means and hence adhesion of said web portions to each other.

6. Apparatus according to claim 3, wherein said register roller means (14) is formed with an axially directed groove (15) which is so positioned with respect to the web portion (2b) passing thereover that a strip of adhesive applied by said adhesive strip application roller means will be positioned above said groove to prevent contact of adhesive substance with the circumferential portion of the register roller (14).

7. For combination with a rotary printing machine delivering a plurality of continuously moving superimposed web portions (2a, 2b),
apparatus for connecting said web portions at a folding line (19) extending transversely to the direction of movement of the web portions,
comprising, in accordance with the invention,
deflection means (4) deflecting one (2b) of said web portions from superimposed position from the other web portion (2a) and guiding said one web portion in a separate path;
adhesive strip application roller means (7,8;21,22;25,26) rotating at the speed of movement of the web portion for applying a strip of adhesive on one of said web portion (2b) at the side thereof facing the other web portion (2a);
said adhesive strip application roller means comprising
two rollers (7,8;20,21) positioned transversely in the path of movement of said one web portion (2b) being guided thereto, said rollers being spaced from each other by a distance greater than the thickness of said one web portion (2b) to permit passage of said one web portion therebetween with clearance, and without contacting circular circumferential portions of either one of said rollers;
means (9,10;24) for coating the circumference of a first one (8,21) of said rollers with adhesive;
and at least one circumferential (11) on a second one (7,20) of said rollers positioned for pressing a discrete surface area of said one web portion (2b) against the first one roller (8) which is coated with adhesive;
register roller means (14) for guiding said one web portion in a predetermined path having a predetermined path length within said separate path;
guide roller means (6) located downstream of said register roller means (14) guiding said deflected web portion into contact with the undeflected web portion (2a);
and a folding apparatus (16) folding said two again superimposed web portions at the folding line and insuring adhesion of the previously deflected web portion (2b) against the undeflected web portion (2a) by the adhesive on the adhesive strip at the folding line.

8. Apparatus according to claim 7, wherein the projection comprises an axially extending ridge or bead or strip (7).

9. Apparatus according to claim 7, including
an adhesive holding trough (24), said first one roller (21) being positioned within said trough, the trough having a rim close to the topmost circumferential position of the first one roller (21);
means (4,12) guiding said one web portion (26) close to the upper edge of the rim without, however, contacting the same;
the second roller (20) pressing said one web portion (2b) against the circumference of the adhesive application roller (21) to apply a strip of adhesive to said one web portion upon rotation of the counter or impression roller.

10. Apparatus according to claim 7, further including a deflection roller (12) deflecting said web portion (2b) and defining at least part of said separate path, said deflection roller being formed with an axially extending groove (13) which is so positioned with respect to the web portion (2b) that a strip of adhesive applied by the adhesive application roller means will be located above said groove to prevent smearing of adhesive on the remaining circumferential portion of said deflection roller.

11. Apparatus according to claim 7, wherein said register roller means (14) is formed with an axially directed groove (15) which is so positioned with respect to the web portion (2b) passing thereover that a strip of adhesive applied by said adhesive strip application roller means will be positioned above said groove to prevent contact of adhesive substance with the circumferential portion of the register roller (14);
further including a deflection roller (12) deflecting said web portion (2b) and defining at least part of said separate path, said deflection roller being formed with an axially extending groove (13) which is so positioned with respect to the web portion (2b) that a strip of adhesive applied by the adhesive application roller means will be located above said groove to prevent smearing of adhesive on the remaining circumferential portion of said deflection roller;
and wherein said guide roller means (6) includes two rollers positioned at opposite sides of most of said web portions (2a, 2b) in contact with each other and insuring adhesion of the adhesive strip applied by the adhesive strip application roller means and hence adhesion of said web portions to each other.

12. Apparatus according to claim 9, wherein said register roller means (14) is formed with an axially directed groove (15) which is so positioned with respect to the web portion (2b) passing thereover that a strip of adhesive applied by said adhesive strip application roller means will be positioned above said groove to prevent contact of adhesive substance with the circumferential portion of the register roller (14).

13. Apparatus according to claim 9, further including a deflection roller (12) deflecting said web portion (2b) and defining at least part of said separate path, said deflection roller being formed with an axially extending groove (13) which is so positioned with respect to the web portion (2b) that a strip of adhesive applied by the adhesive application roller means will be located above said groove to prevent smearing of adhesive on the remaining circumferential portion of said deflection roller.

14. Apparatus according to claim 9, wherein said register roller means (14) is formed with an axially directed groove (15) which is so positioned with respect to the web portion (2b) passing thereover that a strip of adhesive applied by said adhesive strip application roller means will be positioned above said groove to prevent contact of adhesive substance with the circumferential portion of the register roller (14);

further including a deflection roller (12) deflecting said web portion (2b) and defining at least part of said separate path, said deflection roller being formed with an axially extending groove (13) which is so positioned with respect to the web portion (2b) that a strip of adhesive applied by the adhesive application roller means will be located above said groove to prevent smearing of adhesive on the remaining circumferential portion of said deflection roller;

and wherein said guide roller means (6) includes two rollers positioned at opposite sides of most of said web portions (2a, 2b) in contact with each other and insuring adhesion of the adhesive strip applied by the adhesive strip application roller means and hence adhesion of said web portions to each other.

15. For combination with a rotary printing machine delivering a plurality of continuously moving superimposed web portions (2a, 2b), apparatus for connecting said web portions at a folding line (19) extending transversely to the direction of movement of the web portions, comprising, in accordance with the invention, deflection means (4) deflecting one (2b) of said web portions from superimposed position from the other web portion (2a) and guiding said one web portion in a separate path;

adhesive strip application roller means (7,8;21,22;25,26) rotating at the speed of movement of the web portion for applying a strip of adhesive on one of said web portion (2b) at the side thereof facing the other web portion (2a);

said adhesive strip application roller means comprising two rollers (25,26), said web portion (2b) being guided between said rollers, with clearance, and without contact with the circumferential portions of said rollers;

projections (28,29;30,31) extending from the circumference of said rollers and being angularly positioned for mutual engagement and simultaneously contacting opposite sides of said web portion (2b);

and adhesive application means (26',27) applying adhesive to the tips of the projections on at least one (26) of said rollers;

register roller means (14) for guiding said one web portion in a predetermined path having a predetermined path length within said separate path;

guide roller means (6) located downstream of said register roller means (14) guiding said deflected web portion into contact with the undeflected web portion (2a);

and a folding apparatus (16) folding said two again superimposed web portions at the folding line and insuring adhesion of the previously deflected web portion (2b) against the undeflected web portion (2a) by the adhesive on the adhesive strip at the folding line.

16. Apparatus according to claim 15, wherein the projections (28, 29; 30, 31) on at least one of the rollers are projecting bumps or teeth located in axially aligned rows on the respective roller, said bumps or teeth having a dimension in axial direction which is larger than the dimension in circumferential direction.

17. Apparatus according to claim 15, wherein at least one of said projections comprises a radially extending ridge or bead or strip (11, 22, 23).

18. Apparatus according to claim 15, wherein said register roller means (14) is formed with an axially directed groove (15) which is so positioned with respect to the web portion (2b) passing thereover that a strip of adhesive applied by said adhesive strip application roller means will be positioned above said groove to prevent contact of adhesive substance with the circumferential portion of the register roller (14).

19. Apparatus according to claim 15, further including a deflection roller (12) deflecting said web portion (2b) and defining at least part of said separate path, said deflection roller being formed with an axially extending groove (13) which is so positioned with respect to the web portion (2b) that a strip of adhesive applied by the adhesive application roller means will be located above said groove to prevent smearing of adhesive on the remaining circumferential portion of said deflection roller.

20. Apparatus according to claim 15, wherein said register roller means (14) is formed with an axially directed groove (15) which is so positioned with respect to the web portion (2b) passing thereover that a strip of adhesive applied by said adhesive strip application roller means will be positioned above said groove to prevent contact of adhesive substance with the circumferential portion of the register roller (14);

further including a deflection roller (12) deflecting said web portion (2b) and defining at least part of said separate path, said deflection roller being formed with an axially extending groove (13) which is so positioned with respect to the web portion (2b) that a strip of adhesive applied by the adhesive application roller means will be located above said groove to prevent smearing of adhesive on the remaining circumferential portion of said deflection roller;

and wherein said guide roller means (6) includes two rollers positioned at opposite sides of most of said web portions (2a, 2b) in contact with each other and insuring adhesion of the adhesive strip applied by the adhesive strip application roller means and hence adhesion of said web portions to each other.

* * * * *